US011841008B1

(12) United States Patent
Panwar et al.

(10) Patent No.: US 11,841,008 B1
(45) Date of Patent: *Dec. 12, 2023

(54) SHAPE-MEMORY MATERIAL ACTUATORS

(71) Applicant: Toyota Motor Engineering & Manufacturing North America, Inc., Plano, TX (US)

(72) Inventors: Shardul S. Panwar, Ann Arbor, MI (US); Michael P. Rowe, Pinckney, MI (US); Maduran Palaniswamy, Ann Arbor, MI (US); Ryohei Tsuruta, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/163,621

(22) Filed: Feb. 2, 2023

Related U.S. Application Data

(63) Continuation of application No. 17/747,638, filed on May 18, 2022, now Pat. No. 11,592,010.

(51) Int. Cl.
*F03G 7/06* (2006.01)

(52) U.S. Cl.
CPC ......... *F03G 7/06143* (2021.08); *F03G 7/062* (2021.08)

(58) Field of Classification Search
CPC .......................................... F03G 7/06
USPC .................................. 60/526–528
See application file for complete search history.

(56) References Cited

U.S. PATENT DOCUMENTS

| 4,806,815 | A | 2/1989 | Honma |
| 6,116,257 | A | 9/2000 | Yokota et al. |
| 8,172,458 | B2 | 5/2012 | Petrakis |
| 10,371,229 | B2 * | 8/2019 | Gandhi ................. F16F 15/06 |
| 2006/0226013 | A1 | 10/2006 | Decre et al. |
| 2008/0085436 | A1 * | 4/2008 | Langan ............... H01M 50/325 |
| | | | 429/513 |

(Continued)

FOREIGN PATENT DOCUMENTS

| JP | 2006006581 A | 1/2006 |
| JP | 2010117457 A | 5/2010 |

(Continued)

OTHER PUBLICATIONS

Soft actuators for soft robotic applications: a review (https://onlinelibrary.wiley.com/doi/full/10.1002/aisy.202000128) Dated Aug. 23, 2020.

(Continued)

*Primary Examiner* — Shafiq Mian
(74) *Attorney, Agent, or Firm* — Dinsmore & Shohl LLP

(57) ABSTRACT

An actuator that includes a shell, a ring structure within the shell, a shape-memory material wire fixed at opposite points of the ring structure to extend in a first direction across a width of the ring structure, and a cooling fluid provided within the shell and in fluid communication with the shape-memory material wire. When the shape-memory material wire is heated, the shape-memory material wire contracts in the first direction to reduce the width of the ring structure and increases a height of the ring structure extending in a second direction perpendicular to the first direction.

20 Claims, 8 Drawing Sheets

(56) References Cited

U.S. PATENT DOCUMENTS

| | | | | |
|---|---|---|---|---|
| 2008/0267770 | A1* | 10/2008 | Webster | F16J 15/0887 |
| | | | | 415/173.1 |
| 2008/0272259 | A1 | 11/2008 | Zavattieri et al. | |
| 2009/0041085 | A1* | 2/2009 | Petrakis | A61M 31/002 |
| | | | | 374/E5.001 |
| 2010/0221124 | A1* | 9/2010 | Ikushima | F04B 43/0045 |
| | | | | 417/413.1 |
| 2012/0109025 | A1 | 5/2012 | Weinberg et al. | |
| 2013/0075210 | A1 | 3/2013 | Langbein et al. | |
| 2014/0298794 | A1 | 10/2014 | Flaschentrager et al. | |
| 2014/0338324 | A1 | 11/2014 | Jasklowski | |
| 2015/0289994 | A1 | 10/2015 | Engeberg et al. | |
| 2018/0073491 | A1* | 3/2018 | Gissen | B21C 23/002 |
| 2018/0149141 | A1* | 5/2018 | Cullen | F03G 7/06 |
| 2022/0196109 | A1* | 6/2022 | Gandhi | F16F 15/08 |

FOREIGN PATENT DOCUMENTS

| | | |
|---|---|---|
| KR | 1020130005989 A | 1/2013 |
| WO | 2005004321 A1 | 1/2005 |

OTHER PUBLICATIONS

Review of soft fluidic actuators: classification and materials modeling analysis (https://iopscience.iop.org/article/10.1088/1361-665X/ac383a/pdf) Dated Feb. 21, 2022.

A novel fabric muscle based on shape memory alloy springs (https://www.liebertpub.com/doi/pdf/10.1089/soro.2018.0107) Dated Feb. 21, 2022.

U.S. Appl. No. 17/747,638, filed May 18, 2022, Shardul S. Panwar et al.

* cited by examiner

SHAPE-MEMORY MATERIAL ACTUATORS

CROSS-REFERENCE TO RELATED APPLICATIONS

The present application is a continuation of co-pending U.S. patent application Ser. No. 17/747,638 filed on May 18, 2022, for "Shape-Memory Material Actuators", the entire disclosure of which is hereby incorporated by reference in its entireties, including the drawings.

TECHNICAL FIELD

The present specification generally relates to actuators and, in particular, to actuators that include shape-memory material wires.

BACKGROUND

Shape-memory materials (SMMs) may be used as actuators in soft robotics applications. SMMs are generally materials that deform to a first shape or configuration under a first set of environmental variables (for instance, after the temperature of the SMM exceeds a threshold temperature) and re-form to a second, relaxed shape or configuration under a second set of environmental variables (for instance, when the temperature of the SMM drops below the threshold temperature). SMM actuators are typically heated electrically to "activate" or deform the SMM actuator to the first shape. To "deactivate," or re-form, the SMM actuators, the SMMs typically must lose heat from convective heat transfer with the environment. This results in SMM actuators that may be quickly activated, but slowly deactivated, limiting the response time and frequency with which the SMM actuators can be repeatedly actuated.

Accordingly, a need exists for SMM actuators with an improved response time so that the actuators may be activated and deactivated with an increased frequency.

SUMMARY

In one embodiment, an actuator includes a shell, a ring structure within the shell, a shape-memory material wire fixed at opposite points of the ring structure to extend in a first direction across a width of the ring structure, and a cooling fluid provided within the shell and in fluid communication with the shape-memory material wire. When the shape-memory material wire is heated, the shape-memory material wire contracts in the first direction to reduce the width of the ring structure and increases a height of the ring structure extending in a second direction perpendicular to the first direction.

In another embodiment, an actuator includes a shell. The shell includes a rigid top layer and a rigid bottom layer. The actuator further includes a ring structure within the shell, a shape-memory material wire fixed at opposite points of the ring structure to extend in a first direction across a width of the ring structure, and a cooling fluid provided within the shell and in fluid communication with the shape-memory material wire. When the shape-memory material wire is heated, the shape-memory material wire contracts in the first direction to reduce the width of the ring structure and increases a height of the ring structure extending in a second direction perpendicular to the first direction. The rigid bottom layer and the rigid top layer are separated by a first distance when the shape-memory material wire is not heated, and the rigid bottom layer and the rigid top layer are separated by a second distance greater than the first distance when the shape-memory material wire is heated.

In yet another embodiment, a method of actuating an actuator includes providing a current and using a power supply electrically coupled to a shape-memory material wire of the actuator, where the shape-memory material wire is fixed at opposite points of a ring structure to extend in a first direction across a width of the ring structure, the ring structure is positioned within a shell of the actuator. The method further includes heating the shape-memory material wire, wherein heating the shape-memory material wire contracts the shape-memory material wire in the first direction to reduce the width of the ring structure and increases a height of the ring structure extending in a second direction perpendicular to the first direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
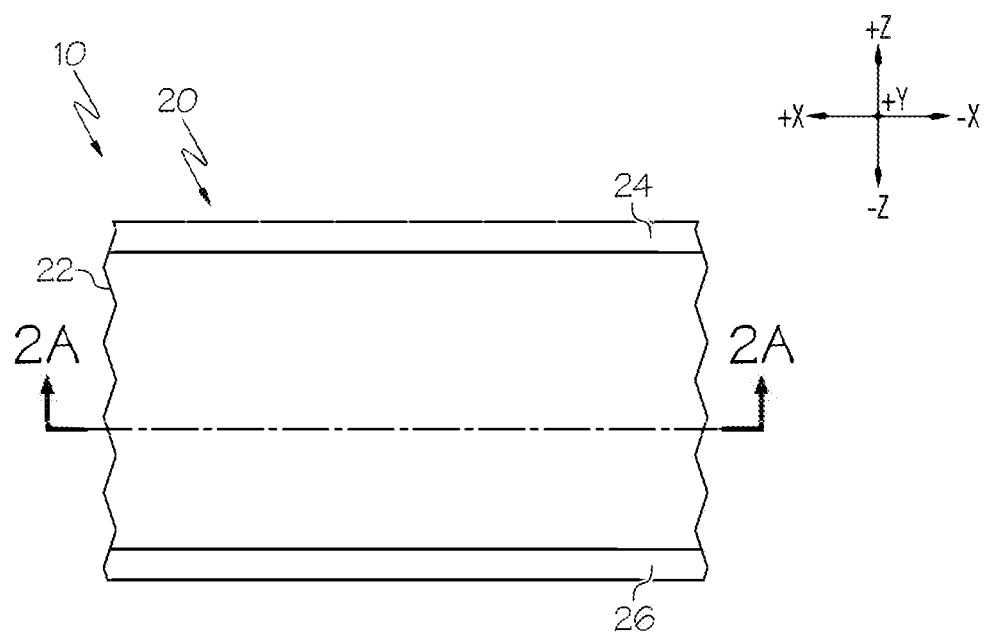
FIG. 1 schematically depicts a side view of an embodiment of an actuator, according to one or more embodiments shown and described herein.

Embodiments described herein are directed to actuators that include a shell and a ring structure within the shell. A shape-memory material wire is fixed at opposite points of the ring structure to extend in a first direction across a width of the ring structure. A current may be applied to the shape-memory material wire to heat the shape-memory wire. As the shape-memory material wire heats, the wire contracts in the first direction to reduce the width of the ring structure, and in turn, increase a height of the ring structure extending in a second direction perpendicular to the first direction. As the height of the ring structure increases, the ring structure may contact and apply a force to at least one of a rigid top layer or a rigid bottom layer of the shell, thereby increasing a distance between the rigid top layer and the rigid bottom layer. To transition the shape-memory material wire from the contracted state to its relaxed state (i.e. its extended state prior to heating the shape-memory material wire), the shape-memory material wire may be cooled by a cooling fluid contained within the shell of the actuator. The cooling fluid absorbs heat from the shape-memory material wire, thereby allowing the shape-memory material wire to extend in the first direction to increase the width of the ring structure and reduce the height of the ring structure in the second direction. Accordingly, the ring structure may be brought out of contact with at least one of the rigid top layer or the rigid bottom layer of the shell, allowing the shell to reduce in height to an initial resting state. Cooling the wire with the cooling fluid allows the shape-memory material wire to quickly extend to its relaxed state, allowing the shape-memory material wire to again be heated and contracted such that the actuator can be repeatedly "fired" or actuated with a high frequency. Various embodiments of the actuators and the operation of the actuators are described in more detail herein. Whenever possible, the same reference numerals will be used throughout the drawings to refer to the same or like parts.

Referring now to FIG. 1, an actuator 10 is schematically depicted. The actuator 10 generally includes a shell 20. The shell 20 may include a rigid top layer 24 and a rigid bottom layer 26 opposite the rigid top layer 24. The rigid top layer 24 and the rigid bottom layer 26 may be made of a plastic, metal, polymer, and/or combinations thereof. In some embodiments, the rigid top layer 24 and the rigid bottom layer 26 may be made of the same material. In some embodiments, the rigid top layer 24 and the rigid bottom layer 26 may be made of different materials. The rigid top layer 24 and the rigid bottom layer 26 may take on any desirable shape, such as, but not limited to, circular, rectangular, or triangular, and have any desirable thickness. The rigid top layer 24 includes an outer surface 35, and the rigid bottom layer 26 includes an outer surface 37.

The shell 20 further includes a pliable material 22. The pliable material 22 extends between the rigid top layer 24 and the rigid bottom layer 26. The pliable material 22 is fixed to the rigid top layer 24. For instance, the pliable material 22 may be fixed along a perimeter of the rigid top layer 24 or along an inner surface 34 (FIG. 2A) of the rigid top layer 24. The pliable material 22 is fixed to the rigid bottom layer 26. For instance, the pliable material 22 may be fixed along a perimeter of the rigid bottom layer 26 or along an inner surface 36 (FIG. 2A) of the rigid bottom layer 26. The pliable material 22 may be fixed to the rigid top layer 24 and the rigid bottom layer 26 by any suitable means, such as with any suitable adhesive. In embodiments, the adhesive or other fixation means is non-soluble. The pliable material 22 is fluidly sealed to the rigid bottom layer 26 and the rigid top layer 24. The pliable material 22 may be any flexible and elastically deformable material. For instance, the pliable material 22 may be able to selectively extend or compress, thereby selectively moving the rigid top layer 24 and/or the rigid bottom layer 26 into and/or out of proximity of each other, as will be discussed in greater detail below. In embodiments, the pliable material 22 may be biaxially oriented polypropylene (BOPP) or another suitable polymer.

Figure 2A:
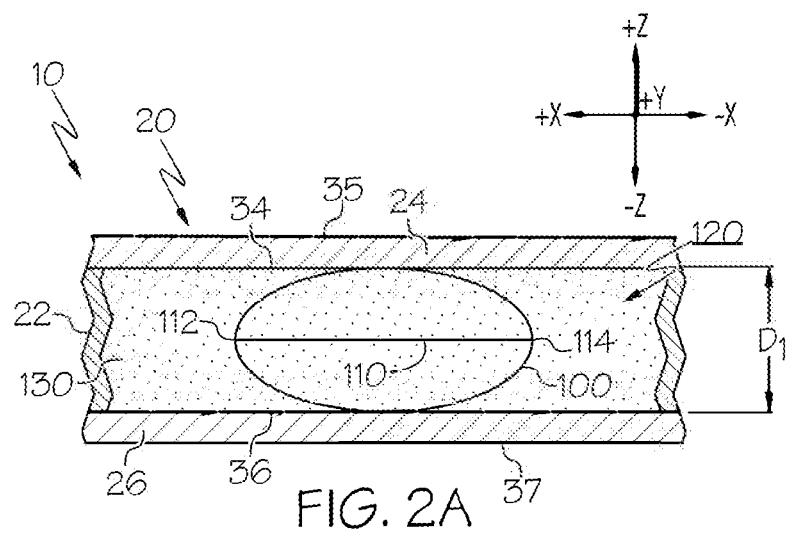
FIG. 2A schematically depicts a cross section of the actuator taken along line 2A-2A of FIG. 1 with a SMM wire in a relaxed state, according to one or more embodiments shown and described here.
Figure 2B:
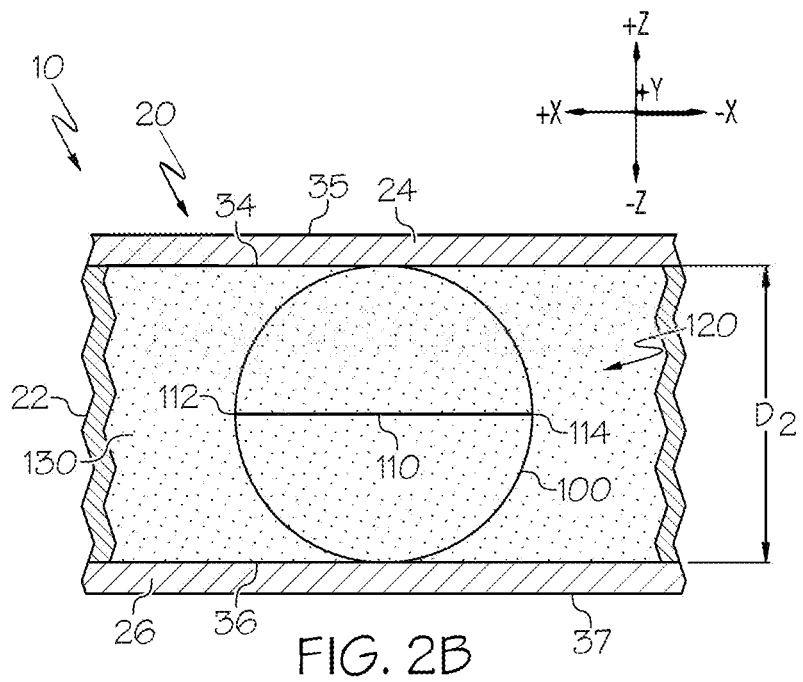
FIG. 2B schematically depicts a cross section of the actuator taken along line 2A-2A of FIG. 1 with the SMM wire in a deformed state, according to one or more embodiments shown and described herein.

Referring now to FIGS. 2A and 2B, a cross section of the actuator 10 is depicted. The rigid top layer 24, the rigid bottom layer 26, and the pliable material 22 define an internal cavity of the 120 of the shell 20. The shell 20 includes a ring structure 100 positioned within the internal cavity 120. While described as a "ring," it should be appreciated that the ring structure 100 may generally take any desirable shape that includes a continuous perimeter defining a height (e.g. in the direction of the z-axis of the coordinate axes of FIGS. 2A and 2B) and a width (e.g. in the direction of the x-axis of the coordinate axes of FIGS. 2A and 2B), such that an increase in the height of the ring structure 100 correlates to a reduction in the width of the ring structure 100, and vice versa. For instance, the ring structure 100 may be annular, spherical, rectangular, or any other desirable shape.

Still referring to FIGS. 2A and 2B, a shape-memory material (SMM) wire 110 is positioned within the internal cavity 120 of the shell 20. More particularly, the SMM wire 110 may be fixed at opposite points of the ring structure 100 to extend in a first direction across a width of the ring structure 100 (e.g. in the direction of the x-axis of the coordinate axes of FIGS. 2A and 2B). For instance, the SMM wire 110 may be fixed to the ring structure 100 at a first point 112 and a second point 114. The SMM wire 110 may be fixed to the ring structure 100 by a suitable adhesive, crimping, soldering, or the like. When heated, the SMM wire 110 transitions from an initial resting state to a second, predetermined deformed shape. When subsequently cooled, the SMM wire 110 returns back to its initial resting state. Particularly, the SMM wire 110 may be configured such that when heated, the SMM wire 110 contracts in the first direction (e.g. in the direction of the x-axis of the coordinate axes of FIGS. 2A and 2B). Contracting in the first direction may involve any shrinkage or bending that brings the first end of the SMM wire 110 connected to the ring structure 100 at the first point 112 and the second end of the SMM wire 110 connected to the ring structure 100 at the second point 114 nearer together in the first direction (e.g. in the direction of the x-axis of the coordinate axes of FIGS. 2A and 2B), thereby reducing a length of the SMM wire 110. Moreover, subsequently cooling the SMM wire 110 causes the SMM wire 110 to extend in the first direction. Extending in the first direction may involve any lengthening or straightening that moves the first end of the SMM wire 110 connected to the ring structure 100 at the first point 112 and the second end of the SMM wire 110 connected to the ring structure 100 at the second point 114 further apart in the first direction, thereby increasing the length of the SMM wire 110. The ring structure 100 may be any material of a desired stiffness, such as a plastic and/or metal. In embodiments in which the ring structure 100 is electrically conductive, the ring structure 100 may be electrically insulated from the SMM wire 110. It should be appreciated that multiple SMM wires 110 may be fixed at opposite points of the ring structure 100 to extend in the first direction across the width of the ring structure 100 (e.g. in the direction of the x-axis of the coordinate axes of FIGS. 2A and 2B).

Transitioning the SMM wire 110 between the deformed, or contracted, state and the relaxed, or extended state, results in a corollary transition in the dimensions of the ring structure 100. That is, when contracting, the SMM wire 110 imparts a force on the ring structure 100 at the first point 112 and the second point 114 that reduces the width of the ring structure 100 (e.g. in the direction of the x-axis of the coordinate axes of FIGS. 2A and 2B). Such a reduction in the width of the ring structure 100 in turn results in an increase of the height of the ring structure in a second direction (e.g. in the direction of the z-axis of the coordinate axes of FIGS. 2A and 2B) perpendicular to the first direction. Similarly, when extending, the SMM wire 110 may impart a force on the ring structure 100 at the first point 112 and the second point 114 that increases the width of the ring structure 100. Such an increase in the width of the ring structure 100 in turn results in a reduction of the height of the ring structure 100 in the second direction perpendicular to the first direction. In some embodiments, when extending, the SMM wire 110 may relax such that the SMM wire 110 does not apply a contracting force on the ring structure 100 at the first point 112 and the second point 114, thereby allowing the rigid top layer 24, and more particularly the weight of the rigid top layer 24, to compress the ring structure 100. Such a compression of the ring structure 100 results in an increase in the width of the ring structure 100 and a reduction of the height of the ring structure 100 in the second direction perpendicular to the first direction.

FIG. 2A depicts the SMM wire 110 in the relaxed state. The actuator 10 and the ring structure 100 are in a non-actuated state with the SMM wire 110 in the relaxed state. When the SMM wire 110 is in the relaxed state, the rigid top layer 24 and the rigid bottom layer 26 of the shell 20 are separated by a first distance $D_1$ in the second direction (e.g. in the direction of the z-axis of the coordinate axes of FIG. 2A). More particularly, the inner surface 34 of the rigid top layer 24 and the inner surface 36 of the rigid bottom layer 26 may be separated by the first distance $D_1$. When the SMM wire 110 is heated, the SMM wire 110 transitions into the deformed state, as shown in FIG. 2B. As noted above, such a transition results in the reduction of the width of the ring structure 100 and an increase in the height of the ring structure 100. As the ring structure 100 increases in height, the ring structure 100 contacts the rigid top layer 24 and the rigid bottom layer 26 to impart a force on the rigid top layer 24 and the rigid bottom layer 26. In doing so, the ring structure 100 may move at least one of the rigid top layer 24 or the rigid bottom layer 26 away from the other, increasing the separation of the rigid top layer 24 and the rigid bottom layer 26 to a second distance $D_2$ in the second direction (e.g. in the direction of the z-axis of the coordinate axes of FIG. 2B). More particularly, when the SMM wire 110 is in the deformed state, the inner surface 34 of the rigid top layer 24 and the inner surface 36 of the rigid bottom layer 26 may be separated by the second distance $D_2$. The actuator 10 and the ring structure 100 are in an actuated state when with the SMM wire 110 in the deformed state. The SMM wire 110 is electrically connected to a power source 912 (FIG. 9) configured to supply a current to the SMM wire 110. Due to the electrical resistivity of the SMM wire 110, the current supplied to the SMM wire 110 causes the SMM wire to heat.

When the SMM wire 110 is in the deformed state, as shown in FIG. 2B, and the SMM wire 110 is cooled, the SMM wire 110 transitions into the relaxed state, as shown in FIG. 2A. As noted above, such a transition results in the reduction of the height of the ring structure 100 (e.g. in the direction of the z-axis of the coordinate axes of FIG. 2A) and an increase in the width of the ring structure 100 (e.g. in the direction of the coordinate axes of FIG. 2A). As the ring structure 100 reduces in height, the force imparted on the rigid top layer 24 and the rigid bottom layer 26 by the ring structure 100 is reduced or eliminated. In doing so, either or both of the rigid top layer 24 and the rigid bottom layer 26 may be permitted to move toward one another in the second direction (e.g. in the direction of the z-axis of the coordinate axes of FIG. 2A), thereby reducing the separation of the rigid top layer 24 and the rigid bottom layer 26 back to the first distance $D_1$.

Still referring to FIGS. 2A and 2B, a cooling fluid 130 may be contained within the internal cavity 120 of the shell 20. The cooling fluid 130 may be any suitable non-toxic and non-volatile liquid. The cooling fluid 130 may be in thermal communication with the SMM wire 110, such that the cooling fluid 130 may cool the SMM wire 110 when the SMM wire 110 is in the deformed state, as shown in FIG. 2B. That is, the cooling fluid 130 may absorb heat from the SMM wire 110 such that the SMM wire 110 may transition from the deformed state shown in FIG. 2B to the relaxed state shown in FIG. 2A as compared to embodiments in which the cooling fluid 130 were not provided. Therefore, the frequency that the actuator 10 can be fired or repeatedly actuated, or the frequency that the SMM wire 110 can be transitioned between the deformed state and the relaxed state may be increased.

Figure 3:
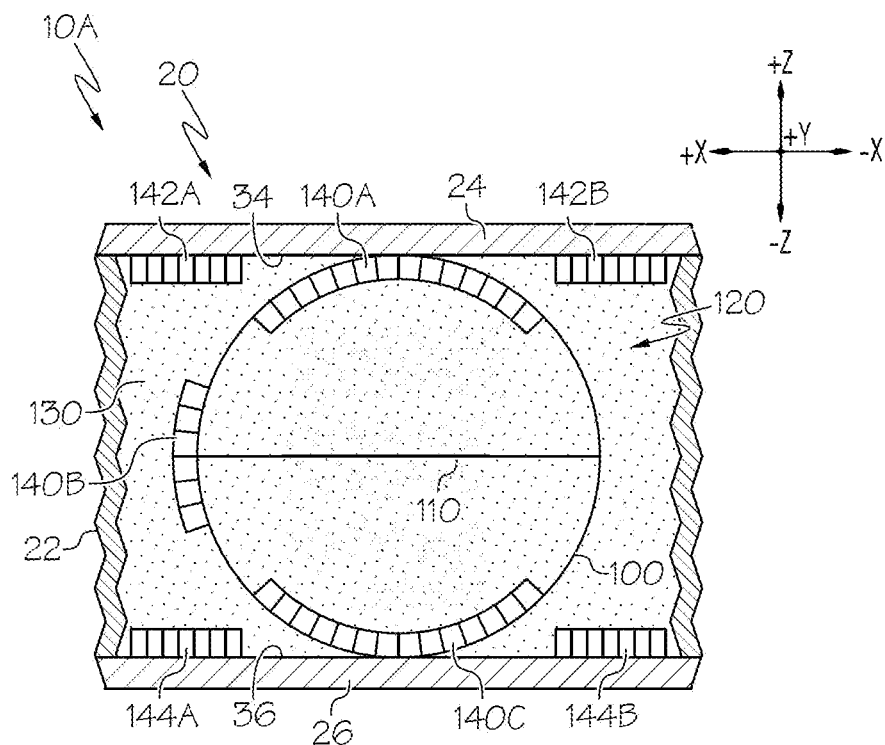
FIG. 3 schematically depicts a cross section of another embodiment of an actuator including a heat sink, according to one or more embodiments shown and described herein.

Referring now to FIG. 3, a cross section of an embodiment of an actuator 10A is depicted according to embodiments. The actuator 10A of FIG. 3 may resemble the actuator 10 discussed with reference to FIGS. 1-2B in all aspects except where noted. In embodiments, actuator 10A includes one or more heat sinks positioned within the internal cavity 120 of the shell 20. For instance, the actuator 10A may include any or all of the heat sinks 140A-C, 142A, 142B, 144A, and 144B. The heat sinks 140A-C are coupled to a surface of the ring structure 100. The heat sinks 142A and 142B are coupled to the inner surface 34 of the rigid top layer 24. The heat sinks 144A and 144B are coupled to the inner surface 36 of the rigid bottom layer 26. The heat sinks 140A-C, 142A, 142B, 144A, and 144B, positioned within the internal cavity 120, are in thermal communication with the cooling fluid 130. The heat sinks 140A-C, 142A, 142B, 144A, and 144B may be any thermally conductive material, such as aluminum, copper, and the like, and are particularly configured to transfer heat from the cooling fluid 130 surrounding and passing through the heat sinks 140A-C, 142A, 142B, 144A, and 144B. For instance, the heat sinks 140A-C, 142A, 142B, 144A, and 144B may include a plurality of fins with fluid passageways disposed between the plurality of fins. The heat sinks 140A-C, 142A, 142B, 144A, and 144B therefore draw heat from the cooling fluid 130 contacting the plurality of surfaces of the heat sinks 140A-C, 142A, 142B, 144A, and 144B. By drawing heat from the cooling fluid 130, the heat sinks 140A-C, 142A, 142B, 144A, and 144B enable the cooling fluid to more quickly and efficiently cool the SMM wire 110, and therefore further increases the frequency that the actuator 10A can be fired or repeatedly actuated, or the frequency that the SMM wire 110 can be transitioned between the deformed state and the relaxed state may be increased.

Figure 4:
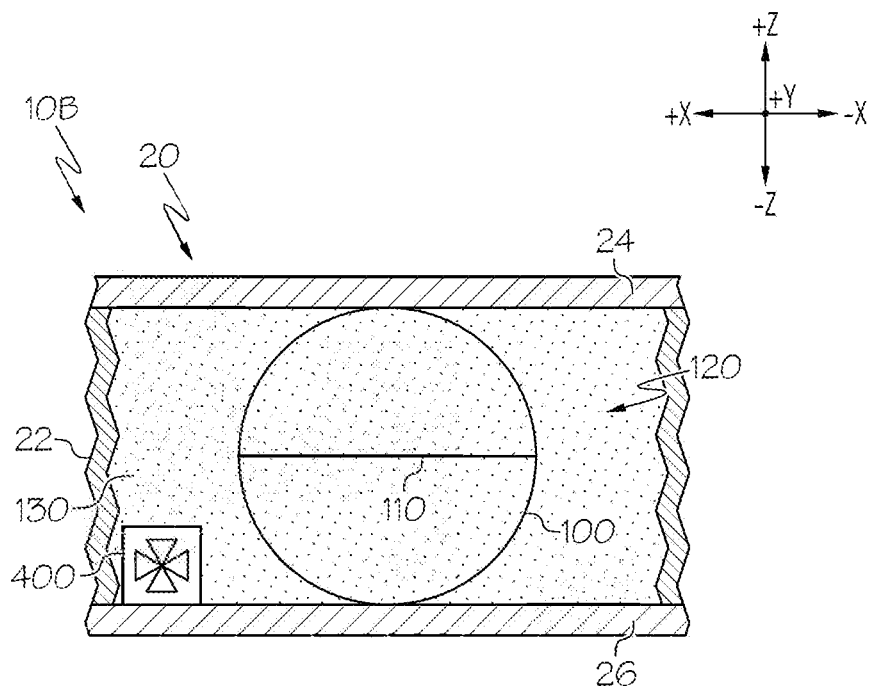
FIG. 4 schematically depicts a cross section of another embodiment of an actuator including an agitator, according to one or more embodiments shown and described herein.

Referring now to FIG. 4, a cross section of an embodiment of an actuator 10B is depicted according to embodiments. The actuator 10B of FIG. 4 may resemble the actuator 10 discussed with reference to FIGS. 1-2B in all aspects except where noted. In embodiments, the actuator 10B includes an agitator 400 positioned within the internal cavity 120 of the shell 20. The agitator 400 may be coupled to rigid top layer 24 or the rigid bottom layer 26 of the shell 20. The agitator 400 may be a pump, fan, or other device configured to circulate the cooling fluid 130 within the internal cavity 120. By increasing the circulation of the cooling fluid 130 within the internal cavity 120, cooling fluid 130 previously not in contact with the SMM wire 110 may be brought into contact with the SMM wire 110, thereby increasing the rate of thermal dissipation from the SMM wire 110 to the cooling fluid 130. By enabling the cooling fluid 130 to more quickly and efficiently cool the SMM wire 110, the agitator 400 further increases the frequency that the actuator 10B can be fired or repeatedly actuated, or the frequency that the SMM wire 110 can be transitioned between the deformed state and the relaxed state. It should be appreciated that in embodiments, the agitator 400 may be incorporated in the shell 20 along with any or all of the heat sinks 140A-C, 142A, 142B, 144A, and 144B discussed with reference to FIG. 3.

Figure 5:
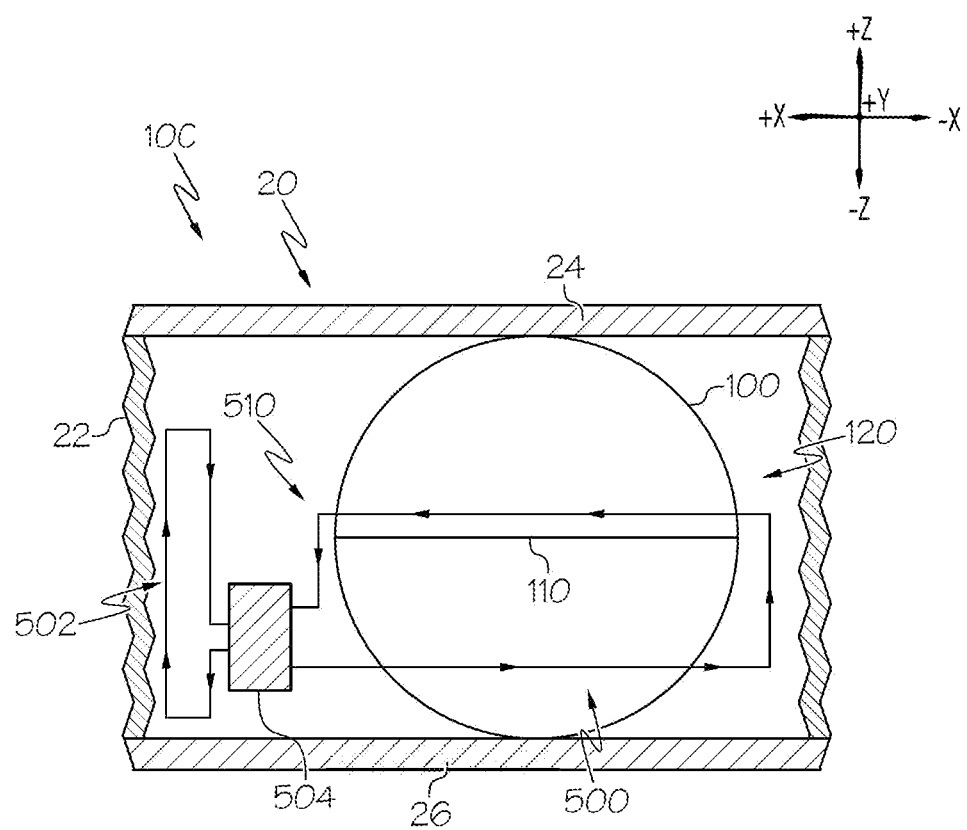
FIG. 5 schematically depicts a cross section of another embodiment of an actuator including a fluid exchange circuit, according to one or more embodiments shown and described herein.

Referring now to FIG. 5, a cross section of an embodiment of an actuator 10C is depicted according to embodiments. The actuator 10C of FIG. 5 may resemble the actuator 10 discussed with reference to FIGS. 1-2B in all aspects except where noted. In embodiments, the actuator 10C includes a fluid exchange circuit 510 positioned within the internal cavity 120 of the shell 20. The fluid exchange circuit 510 generally includes a first circuit 500 for circulating the cooling fluid 130 (FIG. 2A) therein, a second circuit 502 for circulating a working fluid therein, and a heat exchanger 504 for transferring heat between the cooling fluid 130 (FIG. 2A) and the working fluid. At least a portion of the first circuit 500 is positioned near or around the SMM wire 110 such that heat may be transferred from the SMM wire 110 to the cooling fluid 130 (FIG. 2A) in the first circuit 500. The first circuit 500 may include a pump for circulating the cooling fluid 130 (FIG. 2A) through the first circuit 500. The second circuit 502 may similarly include a pump for circulating the working fluid through the second circuit 502. The working fluid of the second circuit 502 may be any desirable liquid or gas. The heat exchanger 504 is configured to transfer heat from the cooling fluid 130 (FIG. 2A) of the first circuit 500 and the working fluid of the second circuit 402 as the cooling fluid 130 (FIG. 2A) and the working fluid pass through the heat exchanger 504. Therefore, the fluid exchange circuit 510, by removing heat from the cooling fluid 130 (FIG. 2A) prior to circulating the cooling fluid 130 (FIG. 2A) back to the SMM wire 110, may increase the rate of thermal dissipation from the SMM wire 110 to the cooling fluid 130 (FIG. 2A). By enabling the cooling fluid 130 (FIG. 2A) to more quickly and efficiently cool the SMM wire 110, the fluid exchange circuit 510 further increases the frequency that the actuator 10C can be fired or repeatedly actuated, or the frequency that the SMM wire 110 can be transitioned between the deformed state and the relaxed state.

In embodiments, the cooling fluid 130 (FIG. 2A) may be entirely contained within tubing of the first circuit 500 of the fluid exchange circuit 510. In such embodiments, the tubing of the first circuit 500 of the fluid exchange circuit 510 may be positioned adjacent to the SMM wire 110 in such proximity that heat may be transferred from the SMM wire 110 to the cooling fluid 130 (FIG. 2A) in the first circuit 500. In some embodiments, the first circuit 500 of the fluid exchange circuit 510 may be at least partially segmented such that the cooling fluid 130 (FIG. 2A) directly contacts the SMM wire 110. For instance, a first segment of the first circuit 500 may include an outlet for directing the cooling fluid 130 (FIG. 2A) into the interior of the ring structure 100 such that the cooling fluid 130 (FIG. 2A) directly contacts the SMM wire 110, and a second segment of the first circuit 500 may include an inlet, opposite the outlet of the first segment, to allow the for the flow of cooling fluid 130 (FIG. 2A) from the interior of the ring structure 100 to the heat exchanger 504.

Figure 6A:
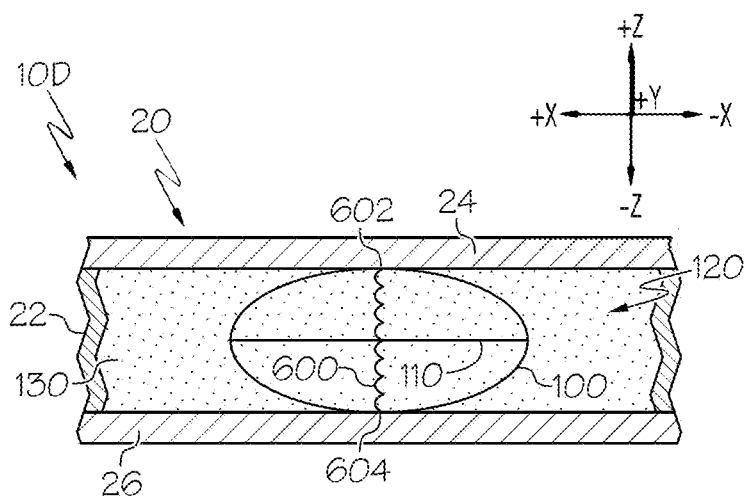
FIG. 6A schematically depicts a cross section of another embodiment of an actuator including a spring and with a SMM wire in a relaxed state, according to one or more embodiments show and described herein.
Figure 6B:
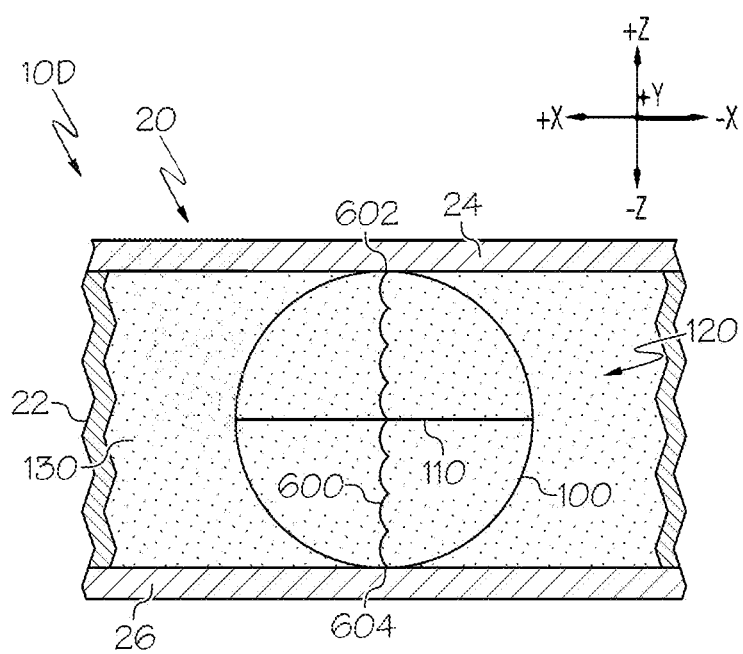
FIG. 6B schematically depicts a cross section of the actuator of FIG. 6A with the SMM wire in a deformed state, according to one or more embodiments show and described herein.

Referring now to FIGS. 6A and 6B, cross sections of an actuator 10D are depicted according to embodiments. The actuator 10D of FIGS. 6A and 6B may resemble the actuator 10 discussed with reference to FIGS. 1-2B in all aspects except where noted. In embodiments, the actuator 10D may include a spring 600. The spring 600 may be fixed at opposite points of the ring structure 100 to extend in the second direction across the height of the ring structure 100 (e.g. in the direction of the z-axis of the coordinate axes of FIGS. 6A and 6B). For instance, the spring 600 may be fixed to the ring structure 100 at a first point 602 and a second point 604. The spring 600 may be fixed to the ring structure 100 by a suitable adhesive, crimping, soldering, or the like. The spring 600 may be configured such that the spring 600 is in its natural resting state when the SMM wire 110 is in the relaxed state, as depicted in FIG. 6A. The spring 600, in its natural resting state, does not apply a tensioning force to the ring structure 100. When the SMM wire 110 is heated and transitions to the contracted state as shown in FIG. 6B, the spring 600 tensions and exhibits a tensioning return force, as the spring 600 is biased to return to its natural resting state. Therefore, the return force of the spring 600 imparts forces on the ring structure 100 at the first point 602 and the second point 604 and assists the ring structure 100 in reducing in height (e.g. from the configuration depicted in FIG. 6B to the configuration shown in FIG. 6A). This return force from the spring 600, in addition to the cooling of the SMM wire 110, increases the rate at which the SMM wire 110 may transition from the contracted state to the extended state, which in turn increases the frequency by which the actuator 10D can be fired or repeatedly actuated. It should be appreciated that, in embodiments, the spring 600 may be incorporated in the shell 20 along with any or all of the heat sinks 140A-C, 142A, 142B, 144A, and 144B, agitators 400, and/or fluid exchange circuits 510 previously discussed.

Figure 7A:
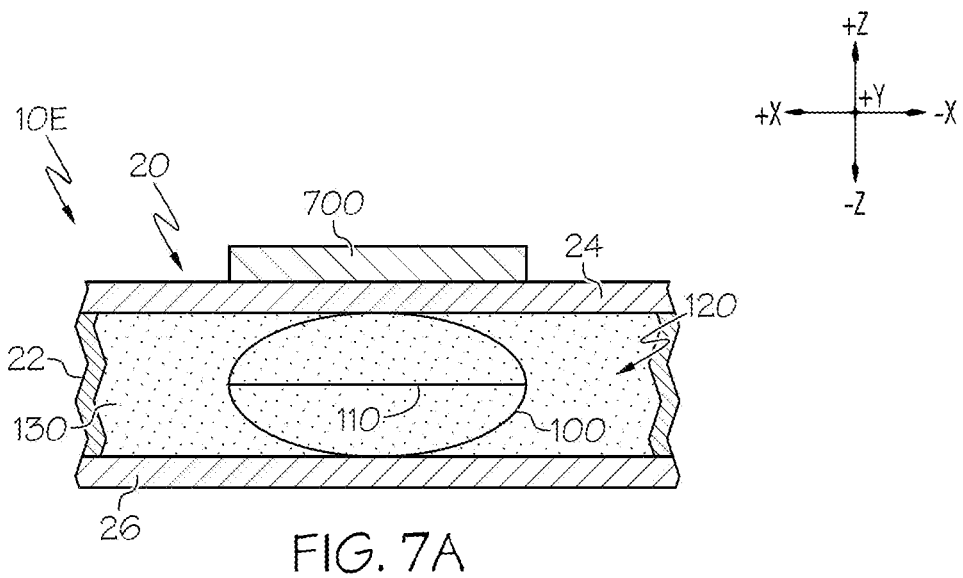
FIG. 7A schematically depicts a cross section of another embodiment of an actuator including a weight positioned on a rigid top layer of a shell of the actuator and with a SMM wire in a relaxed state, according to one or more embodiments show and described herein.
Figure 7B:
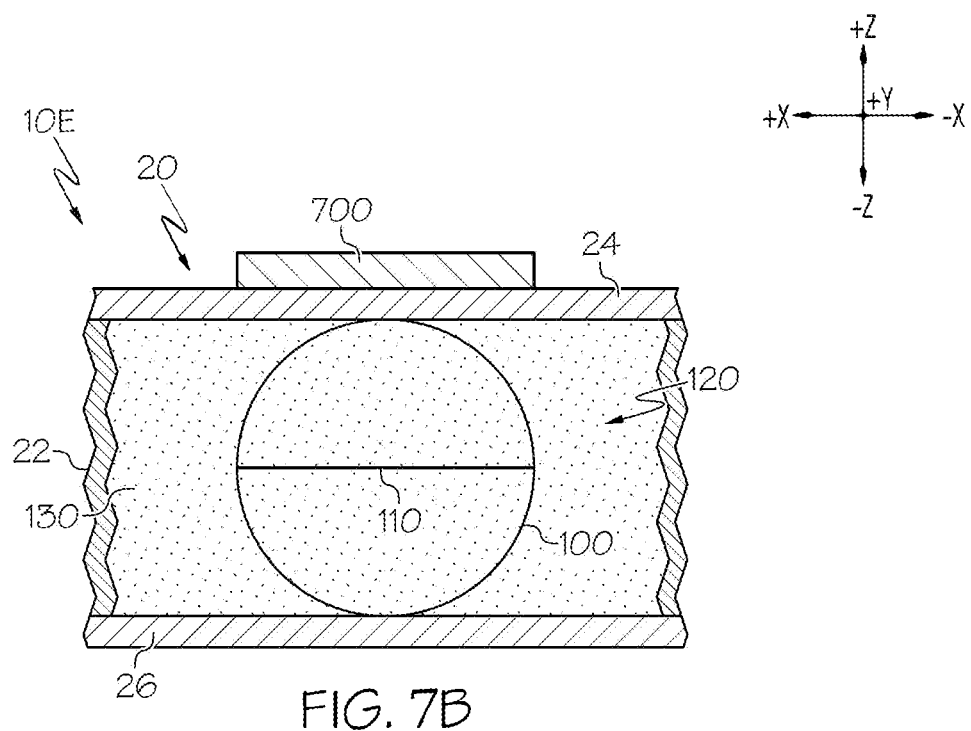
FIG. 7B schematically depicts a cross section of the actuator of FIG. 7A with the SMM wire in a deformed state, according to one or more embodiments show and described herein.

Referring now to FIGS. 7A and 7B, cross sections of an actuator 10E are depicted. The actuator 10E of FIGS. 7A and 7B may resemble the actuator 10 discussed with reference to FIGS. 1-2B in all aspects except where noted. In embodiments, the actuator 10E may include a weight 700. The weight 700 may be positioned on the rigid top layer 24 of the shell 20. The weight 700 provides a compression force on the rigid top layer 24, which in turn transmits the compression force to the ring structure 100. Therefore, the compression force of the weight 700 assists the ring structure 100 in reducing in height (e.g. from the configuration depicted in FIG. 7B to the configuration shown in FIG. 7A). This compression force from the weight 700, in addition to the cooling of the SMM wire 110, increases the rate at which the SMM wire 110 may transition from the contracted state to the extended state, which in turn increases the frequency by which the actuator 10E can be fired or repeatedly actuated.

It should be appreciated that, in embodiments, the weight 700 may be incorporated in the shell 20 along with any or all of the heat sinks 140A-C, 142A, 142B, 144A, and 144B, agitators 400, springs 600, and/or fluid exchange circuits 510 previously discussed.

Figure 8:
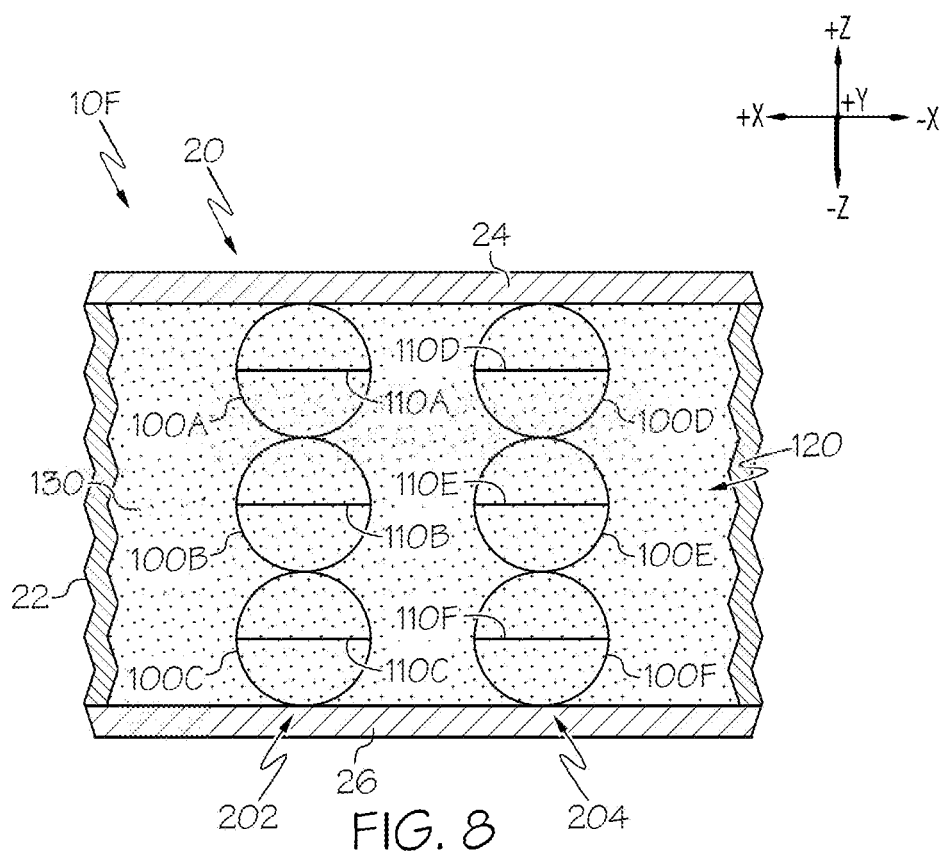
FIG. 8 schematically depicts a cross section another embodiment of an actuator including a pair of stacks of ring structures within an interior of the actuator, according to one or more embodiments show and described herein.

Referring now to FIG. 8, a cross section of an actuator 10F is depicted, according to embodiments. The actuator 10F of FIG. 8 may resemble the actuator 10 discussed with reference to FIGS. 1-2B in all aspects except where noted. The actuator 10F may include a plurality of ring structures. Specifically, a plurality of ring structures 100A-F, each including an SMM wire 110A-F fixed at opposite points of a respective ring structure 100A-F to extend in a first direction across a width of the respective ring structure 100A-F (e.g. in the direction of the x-axis of the coordinate axes of FIG. 8) are positioned within the internal cavity 120 of the shell 20. The internal cavity 120 may include a plurality of stacks of ring structures 100A-F. More specifically, the actuator 10F may include stacks 202, 204 of ring structures 100. A "stack," as used herein, generally refers to an overlapping relationship between a plurality of ring structures 100 throughout the depth (e.g. in the direction of the z axis of the coordinate axes of FIG. 8) of the internal cavity 120. While the actuator 10F is depicted including two stacks 202, 204 of ring structures 100, it should be appreciated that the actuator 10F may include any desirable number of stacks of ring structures 100. The actuator 10F may include stacks of ring structures 100 over the entire length (e.g. in the y direction of the coordinate axes of FIG. 8) and width (e.g. in the x direction of the coordinate axes of FIG. 8) of the actuator 10F. For instance, the stacks 202, 204 of ring structures 100 may be considered to be in a matrix throughout the internal cavity 120 of the shell 20. While the matrix of stacks 202, 204 of ring structures 100 are depicted in a 3×2 matrix in FIG. 8, the matrix of stacks 202, 204 of ring structures may be arranged in a 2×4 or 1×3 or any other desirably dimensioned matrix, for instance. In some embodiments, the stacks 202, 204 of ring structures 100 need not span the entire actuator 10F, such that there may be portions within the internal cavity 120 void of ring structures 100. In some embodiments, the actuator 10F may include a single layer of ring structures 100. In other words, the ring structures 100 of the actuator 10F may not be arranged in stacks of a plurality of ring structures 100 that traverse a depth of the internal cavity 120.

Still referring to FIG. 8, in operation, each of the ring structures 100 may be independently actuatable to apply selective pressure to the rigid top layer 24 of the shell 20 of the actuator 10F. In some embodiments, each stack 202, 204 of ring structures 100 may be independently actuatable to apply selective pressure to the rigid top layer 24 of the shell 20 of the actuator 10F. For example, each ring structure 100A-C of the stack 202 may be simultaneously actuated into an actuated state while the ring structures 100D-F of the stack 204 remain in a non-actuated state. Furthermore, actuation of each of the plurality of ring structures 100 may be controlled by an actuation system 900 (FIG. 9), which may include components housed in an onboard control unit 902 (FIG. 9) coupled to the actuator 10F.

While two stacks 202, 204 of ring structures 100 are depicted along the width of the actuator 10F, it should be appreciated that any number of stacks may be disposed along the width of the actuator 10F. It should also be appreciated that a plurality of stacks of ring structures 100 may further be located across the length of the actuator 10F.

To actuate the actuator 10F, current may be selectively applied to the one or more SMM wires 110A-F, thereby heating the SMM wires 110A-F such that they contract to reduce the width and extend the height of the respective ring structures 100A-F. In some embodiments, each of the ring structures 100 are independently actuatable to apply selective pressure to the rigid top layer 24 of the actuator 10F. As will be discussed further below, depending on the magnitude of the current applied to each of the SMM wires 110, the degree of actuation and pressure applied by the ring structures 100 may vary.

Still referring to FIG. 8, each ring structure 100 of a stack 202, 204 of ring structures may be simultaneously and collectively actuated. In such embodiments, when a stack 202, 204 of ring structures 100 is actuated, each ring structure 100 of the actuated stack 202, 204 may be actuated identically or to the same degree. That is, each SMM wire 110 of each ring structure 100 of a stack 202, 204 may be heated and contracted to the same degree, which in turn results in an equal extension of the ring structures 100 of the stack 202, 204 in the height directions of the ring structures 100. Therefore, the height (e.g. in the z direction of the coordinate axes of FIG. 8) of each ring structure 100A, 100B, and 100C, and therefore of the entire stack 202 of ring structures, for instance, increases.

In some embodiments in which each ring structure 100 of a stack 202, 204 of ring structures may be simultaneously and collectively actuated, each ring structure 100 of the actuated stack 202, 204 need not be identically actuated to the same degree. With reference to stack 202 of ring structures 100A-C, for instance, if the stack 202 is actuated, the ring structures 100A-C in the stack 202 are actuated. However, the ring structure 100A may be actuated to a first degree, the ring structure 100B may be actuated to a second degree, and the ring structure 100C may be actuated to a third degree. This may be achieved by applying different currents to each of the SMM wires 110A-C of the ring structures 100A-C, respectively.

Figure 9:
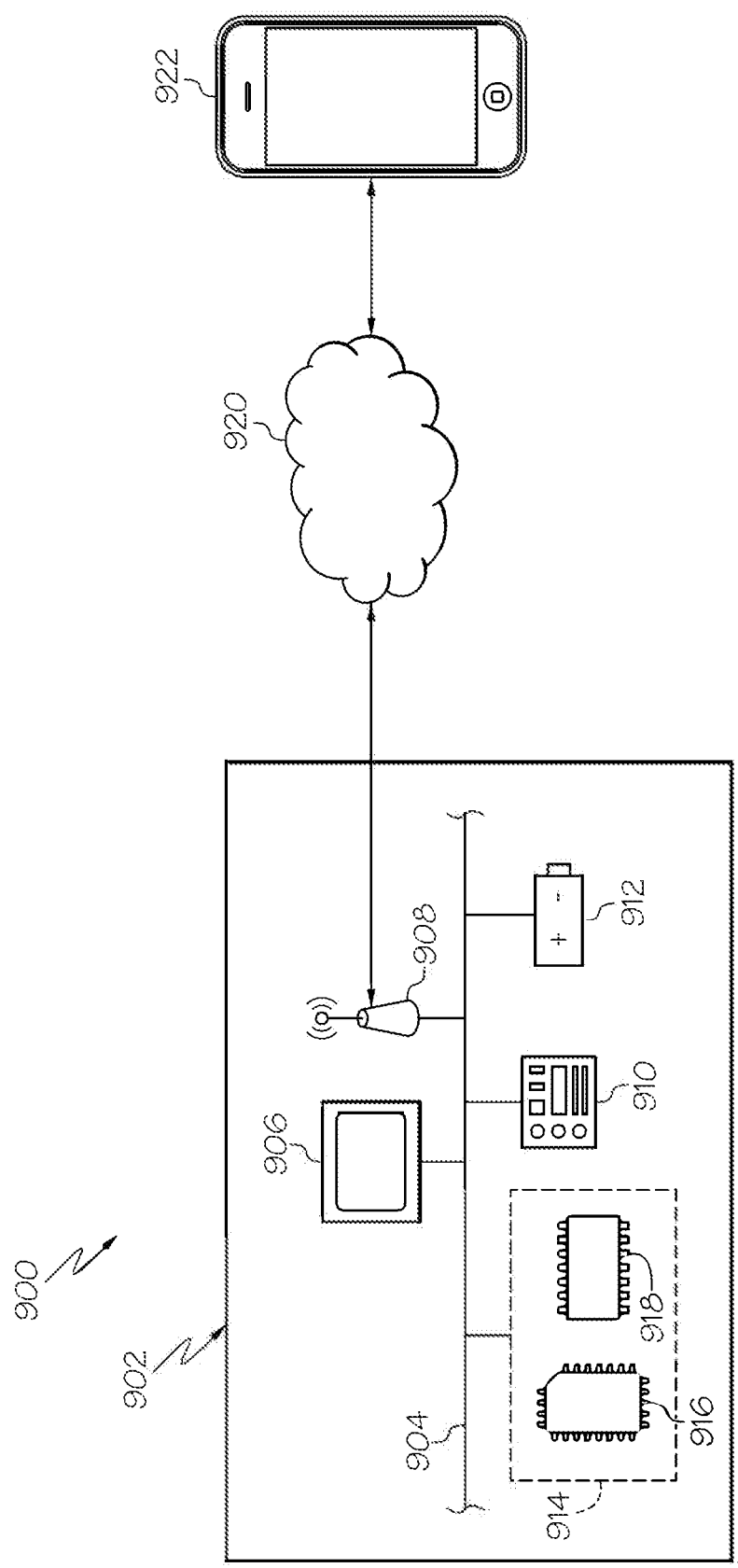
FIG. 9 schematically depicts an actuation system for operating the actuators of FIGS. 1-8, according to one or more embodiments shown and described herein.

In operation, a user may selectively actuate particular stacks 202, 204 of ring structures 100 through the actuation system 900 (FIG. 9). For instance, the stack 202 may apply a first force to the rigid top layer 24 and/or the rigid bottom layer 26, and the stack 204 may apply a second force to the rigid top layer 24 and/or the rigid bottom layer 26. In operation, a user may selectively actuate particular ring structures 100 through the actuation system 900 (FIG. 9).

Referring now to FIG. 9, an actuation system 900 may be provided for operating any of the above described actuators 10-10F, in particular, for operating the one or more ring structures 100 of the actuators 10-10F, for example, based on sensor measurements of one or more pressure sensors, instructions provided by a user, or a combination thereof. The actuation system 900 may comprise a controller 914, an operating device 910, a power supply 912, a display device 906, network interface hardware 908, and a communication path 904 communicatively coupled these components, some or all of which may be disposed in the onboard control unit 902. Furthermore, the actuation system 900 may be communicatively coupled to the one or more ring structures 100, and particularly the one or more SMM wires 110 of the one or more ring structures 100.

The controller 914 comprises a processor 916 and a non-transitory electronic memory 918 to which various components are communicatively coupled. In some embodiments, the processor 916 and the non-transitory electronic memory 918 and/or the other components are included within a single device. In other embodiments, the processor 916 and the non-transitory electronic memory 918 and/or the other components may be distributed among multiple devices that are communicatively coupled. The controller 914 includes non-transitory electronic memory 918 that stores a set of machine-readable instructions. The processor 916 executes the machine-readable instructions stored in the non-transitory electronic memory 918. The non-transitory electronic memory 918 may comprise RAM, ROM, flash memories, hard drives, or any device capable of storing machine-readable instructions such that the machine-readable instructions can be accessed by the processor 916. Accordingly, the actuation system 900 described herein may be implemented in any conventional computer programming language, as pre-programmed hardware elements, or as a combination of hardware and software components. The non-transitory electronic memory 918 may be implemented as one memory module or a plurality of memory modules.

In some embodiments, the non-transitory electronic memory 918 includes instructions for executing the functions of the actuation system 900. The instructions may include instructions for operating the actuators 10-10F, for example, and instructions for contracting or extending the SMM wire 110, and in turn controlling the height of the ring structure 100. The SMM wires, and therefore ring structures 100, may be controlled individually and/or simultaneously and collectively in stacks. The instructions may include instructions for applying currents to the SMM wires 110 to contract the SMM wires 110. The instructions may also include instructions for controlling the agitator 400, fluid exchange circuit 510, or other cooling mechanism within the actuator.

The processor 916 may be any device capable of executing machine-readable instructions. For example, the processor 916 may be an integrated circuit, a microchip, a computer, or any other computing device. The non-transitory electronic memory 918 and the processor 916 are coupled to the communication path 904 that provides signal interconnectivity between various components and/or modules of the actuation system 900. Accordingly, the communication path 904 may communicatively couple any number of processors with one another, and allow the modules coupled to the communication path 904 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 9, the communication path 904 communicatively couples the processor 916 and the non-transitory electronic memory 918 of the controller 914 with a plurality of other components of the actuation system 900. For example, the actuation system 900 depicted in FIG. 16 includes the processor 916 and the non-transitory electronic memory 918 communicatively coupled with the operating device 910 and the power supply 912.

The operating device 910 allows for a user to control operation of the actuators 10-10F. In some embodiments, the operating device 910 may be a switch, toggle, button, or any combination of controls to provide user operation. The operating device 910 is coupled to the communication path 904 such that the communication path 904 communicatively couples the operating device 910 to other modules of the actuation system 900. The operating device 910 may provide a user interface for receiving user instructions as to a specific operating configuration of the actuators 10-10F, such as an operating configuration to adjust the height of the actuators 10-10F by deforming stacks or individual ring structures 100, to apply a particular force to the rigid top layer 24 and/or rigid bottom layer of the 26 of the shell 20, and/or to operate the actuators 10-10F in a feedback loop such that the height of the actuators 10-10F and/or pressure applied to the rigid top layer 24 and/or rigid bottom layer 26 of the actuators 10-10F are automatically adjusted based on readings from a sensor.

The power supply 912 (e.g., battery) provides current to the one or more SMM wires 110 of the one or more ring structures 100 of the actuators 10-10F. In some embodiments, the power supply 912 is a rechargeable direct current power source. It is to be understood that the power supply 912 may be a single power supply or battery for providing current to the one or more SMM wires 110 of the actuators 10-10F. A power adapter (not shown) may be provided and electrically coupled via a wiring harness or the like for providing current to the SMM wires 110 of the actuators 10-10F.

In some embodiments, the actuation system 900 also includes a display device 906. The display device 906 is coupled to the communication path 904 such that the communication path 904 communicatively couples the display device 906 to other modules of the actuation system 900. The display device 906 may be located on the actuators 10-10F, for example, as part of the onboard control unit 902, and may output a notification in response to an actuation state of the actuators 10-10F or indication of a change in the actuation state of the actuators 10-10F. The display device 906 may also display sensor measurements, such as pressure measurements. Moreover, the display device 906 may be a touchscreen that, in addition to providing optical information, detects the presence and location of a tactile input upon a surface of or adjacent to the display device 906. Accordingly, the display device 906 may include the operating device 910 and receive mechanical input directly upon the optical output provided by the display device 906.

In some embodiments, the actuation system 900 includes network interface hardware 908 for communicatively coupling the actuation system 900 to a portable device 922 via a network 920. The portable device 922 may include, without limitation, a smartphone, a tablet, a personal media player, or any other electric device that includes wireless communication functionality. It is to be appreciated that, when provided, the portable device 922 may serve to provide user commands to the controller 914, instead of the operating device 910. As such, a user may be able to control or set a program for controlling the ring structures of the actuators 10-10F utilizing the controls of the operating device 910. Thus, the SMM wires 110 and ring structures 100 of the actuators 10-10F may be controlled remotely via the portable device 922 wirelessly communicating with the controller 914 via the network 920.

It should now be understood that embodiments described herein are directed to actuators that include a shell and a ring structure within the shell. A shape-memory material wire is fixed at opposite points of the ring structure to extend in a first direction across a width of the ring structure. A current may be applied to the shape-memory material wire to heat the shape-memory wire. As the shape-memory material wire heats, the wire contracts in the first direction to reduce the width of the ring structure, and in turn, increase a height of the ring structure extending in a second direction perpendicular to the first direction. As the height of the ring structure increases, the ring structure may contact and apply a force to at least one of a rigid top layer or a rigid bottom layer of the shell, therefore increasing the distance between the rigid top layer and the rigid bottom layer. To transition the shape-memory material wire from the contracted state to its relaxed state (i.e. its extended state prior to heating the wire), the wire may be cooled by a cooling fluid contained within the shell of the actuator. The cooling fluid absorbs heat from the shape-memory material wire, thereby allowing the wire to extend in the first direction to increase the width of the ring structure and reduce the height of the ring structure in the second direction. Accordingly, the ring structure may be brought out of contact with at least one of the rigid top layer or the rigid bottom layer of the shell, allowing the shell to reduce in height to an initial resting state. Cooling the wire with the cooling fluid allows the wire to quickly extend to its relaxed state, allowing the wire to again be heated and contracted such that the actuator can be repeatedly "fired" with a high frequency.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An actuator comprising:
a shell;
a ring structure within the shell; and
a shape-memory material wire extending in a first direction across a width of the ring structure,
wherein a height of the ring structure extending in a second direction perpendicular to the first direction increases when the shape-memory wire is heated.

2. The actuator of claim 1, further comprising:
a cooling fluid provided within the shell and in fluid communication with the shape-memory material wire; and
a heat sink positioned on the ring structure and in fluid communication with the cooling fluid.

3. The actuator of claim 1, further comprising:
a plurality of ring structures within the shell; and
a plurality of shape-memory material wires, wherein:
the plurality of shape-memory material wires are fixed at opposite points of each of the plurality of ring structures to extend in a first direction across a width of each of the plurality of ring structures, wherein when the plurality of shape-memory material wires are heated, the shape-memory material wires contract in the first direction to reduce the width of the plurality of ring structures and increase a height of the plurality of ring structures extending in a second direction perpendicular to the first direction.

4. The actuator of claim 1, further comprising a spring fixed at opposite points of the ring structure to extend in the second direction across the height of the ring structure.

5. The actuator of claim 1, further comprising
a cooling fluid provided within the shell and in fluid communication with the shape-memory material wire; and
a fluid exchange circuit comprising:
a first circuit for circulating the cooling fluid;
a second circuit for circulating a working fluid; and
a heat exchanger for transferring heat between the cooling fluid and the working fluid.

6. The actuator of claim 2, further comprising an agitator positioned within the shell for circulating the cooling fluid.

7. An actuator comprising:
a shell, comprising:
a rigid top layer; and
a rigid bottom layer;
a ring structure within the shell; and
a shape-memory material wire extending in a first direction across a width of the ring structure,
wherein:
the rigid bottom layer and the rigid top layer are separated by a first distance when the shape-memory material wire is not heated; and
the rigid bottom layer and the rigid top layer are separated by a second distance greater than the first distance when the shape-memory material wire is heated.

8. The actuator of claim 7, wherein the shell comprises a pliable material extending between the rigid top layer and the rigid bottom layer.

9. The actuator of claim 7, wherein when the shape-memory material wire is heated, the ring structure contacts the rigid top layer and the rigid bottom layer.

10. The actuator of claim 7, further comprising:
a cooling fluid provided within the shell and in fluid communication with the shape-memory material wire; and
a heat sink positioned on at least one of an inner surface of the rigid top layer of the shell or an inner surface of the rigid bottom layer of the shell and in fluid communication with the cooling fluid.

11. The actuator of claim 7, further comprising a weight positioned on the rigid top layer of the shell, the weight providing a load to compress the ring structure when the shape-memory material wire is not heated.

12. A method of actuating an actuator, comprising:
providing a current, using a power supply electrically coupled to a shape-memory material wire of the actuator, wherein:
the shape-memory material wire extending in a first direction across a width of the ring structure; and
the ring structure is positioned within a shell of the actuator; and
heating the shape-memory material wire, wherein heating the shape-memory material wire contracts the shape-memory material wire in the first direction to reduce the width of the ring structure and increases a height of the ring structure extending in a second direction perpendicular to the first direction.

13. The method of claim 12, wherein increasing the height of the ring structure increases a height of the shell of the actuator.

14. The method of claim 12, further comprising:
circulating a fluid provided within the shell of the actuator such that the fluid is in fluid communication with the shape-memory material wire; and
cooling the shape-memory material wire with the fluid, wherein cooling the shape-memory material wire extends the shape-memory material wire in the first direction to increase the width of the ring structure and reduce the height of the ring structure in the second direction.

15. The method of claim 14, wherein reducing the height of the ring structure reduces a height of the shell of the actuator.

16. The method of claim 14, wherein circulating the fluid further comprises agitating the fluid with an agitator positioned within the shell.

17. The method of claim 14, wherein circulating the fluid further comprises circulating the fluid in a first circuit and through a heat exchanger, wherein the heat exchanger is configured to transfer heat between the fluid in the first circuit and a working fluid in a second circuit.

18. The method of claim 14, wherein circulating the fluid further comprises contacting the fluid with a heat sink positioned within the shell.

19. The method of claim 12, further comprising reducing the height of the ring structure by a return force of a spring, wherein the spring is fixed at opposite points of the ring structure to extend in the second direction across the height of the ring structure.

20. The method of claim 12, further comprising reducing the height of the ring structure by a compression force of a weight, the weight positioned on a rigid top layer of the shell.

* * * * *

UNITED STATES PATENT AND TRADEMARK OFFICE
CERTIFICATE OF CORRECTION

PATENT NO. : 11,841,008 B1
APPLICATION NO. : 18/163621
DATED : December 12, 2023
INVENTOR(S) : Shardul S. Panwar et al.

Page 1 of 1

It is certified that error appears in the above-identified patent and that said Letters Patent is hereby corrected as shown below:

On the Title Page

Item (73), assignee 2, city, delete "Toyota (JP)", and insert --Toyota-shi, Aichi-ken (JP)--, therefor.

Column 2, item (56), U.S. patent documents, cite no. 6, delete "Langan", and insert --Langan et al.--, therefor.

In page 2, Column 1, item (56), U.S. patent documents, cite no. 10, delete "Gissen", and insert --Gissen et al.--, therefor.

In the Claims

In Column 13, Line(s) 57, Claim 5, after "comprising", insert --:--.

Signed and Sealed this
Thirtieth Day of January, 2024

Katherine Kelly Vidal
*Director of the United States Patent and Trademark Office*